United States Patent
Zamer

(10) Patent No.: US 10,223,677 B2
(45) Date of Patent: *Mar. 5, 2019

(54) COMPLETION OF ONLINE PAYMENT FORMS AND RECURRING PAYMENTS BY A PAYMENT PROVIDER SYSTEMS AND METHODS

(71) Applicant: PAYPAL, INC., San Jose, CA (US)

(72) Inventor: Kamal Zamer, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,637

(22) Filed: Sep. 11, 2017

(65) Prior Publication Data

US 2018/0121893 A1    May 3, 2018

Related U.S. Application Data

(63) Continuation of application No. 14/026,776, filed on Sep. 13, 2013, now Pat. No. 9,760,872.

(51) Int. Cl.
| | |
|---|---|
| G06Q 20/08 | (2012.01) |
| G06Q 20/14 | (2012.01) |
| G06Q 20/12 | (2012.01) |
| G06Q 20/10 | (2012.01) |
| G06Q 20/22 | (2012.01) |

(52) U.S. Cl.
CPC .......... *G06Q 20/102* (2013.01); *G06Q 20/08* (2013.01); *G06Q 20/12* (2013.01); *G06Q 20/14* (2013.01); *G06Q 20/227* (2013.01)

(58) Field of Classification Search
None
See application file for complete search history.

(56) References Cited

U.S. PATENT DOCUMENTS

| | | | |
|---|---|---|---|
| 2011/0276414 A1 | 11/2011 | Subbarao et al. | |
| 2012/0116902 A1 | 5/2012 | Cardina et al. | |
| 2014/0189808 A1* | 7/2014 | Mahaffey | H04L 63/083 726/4 |

* cited by examiner

*Primary Examiner* — Joseph W. King
(74) *Attorney, Agent, or Firm* — Haynes and Boone, LLP

(57) ABSTRACT

There is provided systems and method for automatic completion of online payment forms and recurring payments. The methods include determining if a user is engaged in a financial transaction, requesting permission to use an payment provider to complete the financial transaction, and completing the financial transaction using the payment provider if permission is granted, wherein the payment provider provides user information to complete the financial transaction. The financial transaction may include a payment form including at least one field, a recurring payment, or a payment to a merchant utilized by the user.

20 Claims, 5 Drawing Sheets

COMPLETION OF ONLINE PAYMENT FORMS AND RECURRING PAYMENTS BY A PAYMENT PROVIDER SYSTEMS AND METHODS

CROSS-REFERENCE TO RELATED APPLICATIONS

This application claims priority to and is a continuation of U.S. patent application Ser. No. 14/026,776 filed Sep. 13, 2013, which is hereby incorporated by reference in its entirety.

BACKGROUND

Technical Field

The present application generally relates to automatic completion of online payment forms and recurring payments and more specifically to an application to recognize payment webpages and recurring online bill payments, alert a user, and complete the payment webpages and recurring online bill payments for the user.

Related Art

A user may engage in online financial transactions when purchasing items and paying bills. For example, users may select an item to purchase and navigate to a payment and checkout page where the user is required to enter information including financial information, such as a credit card or other payment method. However, completion of the page may be time consuming and repetitive. Certain vendors may offer user accounts that store user information to be recalled on checkout, however, the vendor may still require financial information to be entered for payment of the item. Thus, the user is required to expose potentially sensitive material, which may leave the user vulnerable to the financial information being stolen or otherwise misappropriated.

Figure 1:
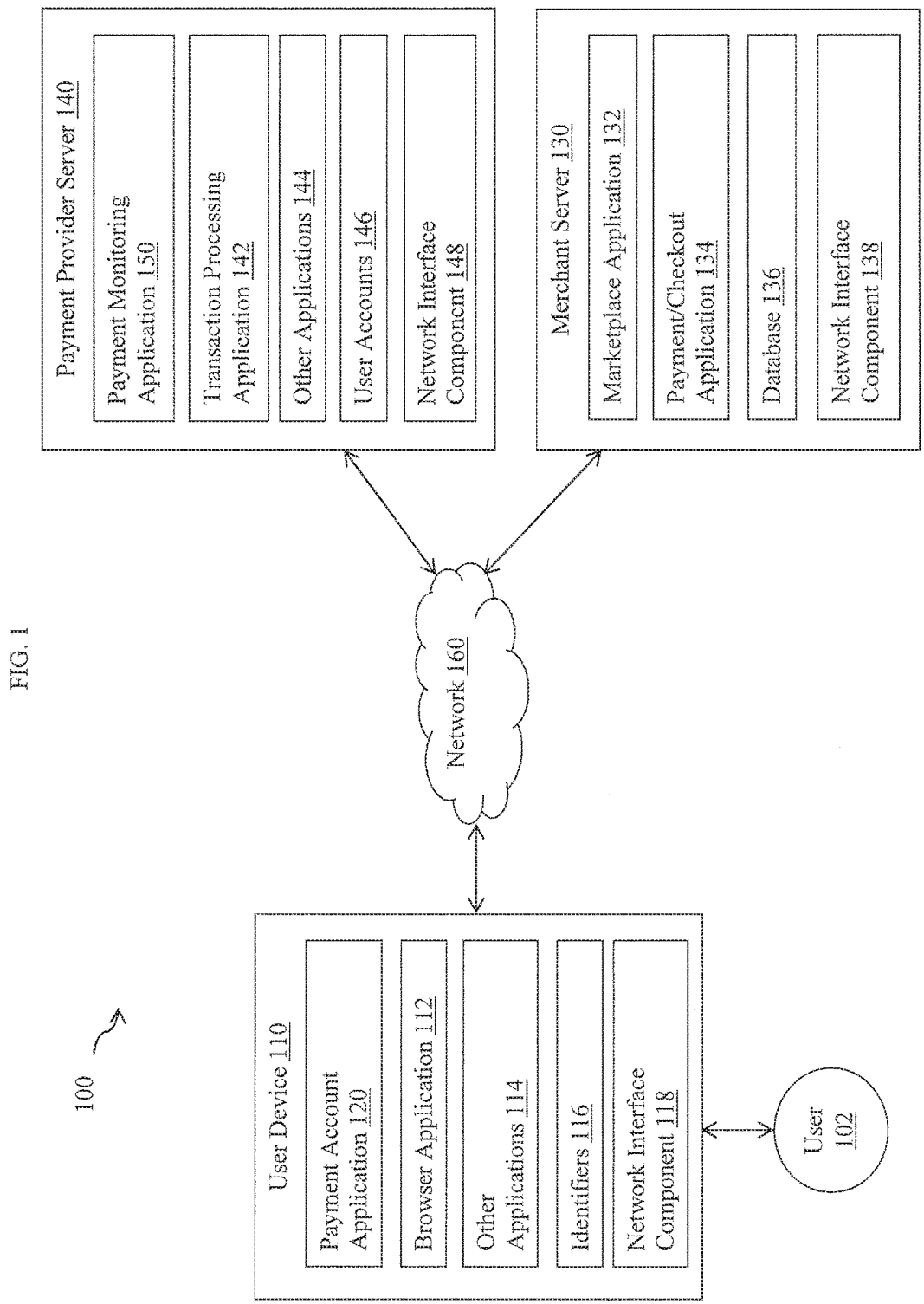
FIG. 1 is a block diagram of a networked system suitable for implementing the process described herein according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In certain embodiments, a user may interact with a user device to visit merchant webpages and/or use merchant applications to purchase items, such as goods and services. After the user has selected one or more items for purchase, the user may navigate to a checkout and payment page. The user may have another application running or website open that corresponds to a payment service provider where the user has previously established a payment account. Thus, when the application or website receives data corresponding to the checkout and payment page, the application or website may request permission from the user to utilize the payment provider to complete the purchase, even though the merchant application or site may not list the payment provider as a payment option. Upon receiving permission, the payment provider may access user information, such as financial information, personal/shipping information, and other information relevant to completing a financial transaction. The application or website may then populate fields on the merchant site or application for checkout and payment, assisting the user with a quick checkout.

Where funds exist with the payment provider and a financial account is not established with the payment provider, a temporary account number may be utilized, such as a temporary credit/debit card number, which is used to populate the funding source information on the merchant payment page. In other embodiments, the temporary number may be created and used even when the user has a financial account or funding source associated with the account to provide an extra layer of security for the user. The merchant can then process the payment directly through bank or credit card rails without involving the payment provider. The payment provider then reconciles the payment with the user's account, depending on whether the user's own funding source was used or whether the temporary account number was used. Note that the temporary account number may be used in subsequent transactions and would be associated with the user's payment provider account. Therefore, the user is able to make payments using the payment provider even though the payment provider is not an accepted payment option for the merchant.

In some embodiments, a user may set up an account with a payment service provider including user financial and/or personal information. The payment provider may include information corresponding to the consumer's credit cards, bank accounts, or other financial account. Additionally, a user device may install a payment account application or other financial application from the payment provider on the user device. While the user utilizes the user device to make payments to merchants, the payment provider may monitor websites and/or applications used, or the user's financial account(s). Thus, the payment provider may be informed of the user's financial transactions.

Using this information, a payment service provider may determine recurring payments to a particular merchant, such as monthly bills. The payment provider may contact the user through an application to establish automatic payments to the merchant using the payment provider. If permission is granted, the payment provider can utilize the merchant's public application programming interface(s) (APIs) to access payment services of the merchant and complete the recurring payments by providing an automatic debit from the user's financial account. In other embodiments, the payment provider may view a merchant the user has utilized in the past. The payment provider may contact the user through the application and request permission to utilize the payment provider to complete future payments with the merchant. A graphical user interface (GUI) in the application may allow the user to complete payment options for the purchase. The payment options may be stored and then recalled for future purchases using the merchant.

FIG. 1 is a block diagram of a networked system 100 suitable for implementing the process described herein according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a merchant server 130, and a payment provider server 140 in communication over a network 160. User 102, such as a consumer, may utilize user device 110 to browsing items on a merchant website or with a merchant application. In certain embodiments, user device 110 may receive information determining that the user is engaging in a financial transaction with merchant server 130, and request permission to utilize payment provider server 140 to complete the financial transaction.

User device 110, merchant server 130, and payment provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented using any appropriate hardware and software configured for wired and/or wireless communication with merchant server 130 and/or payment provider server 140. For example, in one embodiment, user device 110 may be implemented as a personal computer (PC), a smart phone, personal digital assistant (PDA), laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a user device is shown, the user device may be managed or controlled by any suitable processing device. Although only one user device is shown, a plurality of user devices may be utilized.

User device 110 of FIG. 1 contains a payment account application 120, a browser application 112, other applications 114, identifiers 116, and a network interface component 118. Payment account application 120, browser/application 112, and other applications 114 may correspond to processes, procedures, and/or applications executable by a hardware processor, for example, a software program. In other embodiments, user device 110 may include additional or different software as required.

Payment account application 120 may correspond to an application, such as a software application for execution by one or more hardware processors of user device 110, enabling user 102 to establish, access, and/or maintain a user account with a payment service provider, such as payment provider server 140. Payment account application 120 may enable user 102 to set, view, and change account information and settings, such as user information including user personal information, user billing/shipping information, user financial information, and other user account information. Payment account application 120 may interact with a payment service provider, such as payment provider server 140, in order to transmit and receive user information.

Payment account application 120 may also check applications and websites user 102 interacts with to determine if user 102 is engaged in a financial transaction. For example, user 102 may view a checkout and/or payment webpage, such as a payment form having at least one field, while purchasing an item on from a merchant website. The payment form may require user 102 to enter information and may not provide integration with a payment provider of choice by user 102, such as payment provider server 140. Payment account application 120 may request permission to complete the payment form by entering user information into the field(s) of the webpage. Permission may be requested in the form of a pop up and/or message displayed on detection of the financial transaction. For example, payment account application 120 may display a message within payment account application 120 or utilize "push notifications" to alert user 102 of the potential to use payment account application 120 to assist is completing the financial transaction. Payment account application 120 may also provide notifications in the form of emails and/or text messages, including notifications from payment provider server 140. In other embodiments, user 102 may select an option to automatically utilize payment account application 120 to complete the financial transaction, such as an application setting/preference.

In certain embodiments, payment account application 120 may possess user financial information to complete payment of the item. However, in other embodiments, user 102 may wish to utilize funds possessed by the payment service provider to provide payment for the item. Thus, the payment provider may offer a temporary account number to payment account application 120 to complete payment for the item. In various embodiments, payment account application 120 may determine user 102 is engaged in a financial transaction using the uniform resource locator (URL) of the webpage, such as an identification of "checkout" or "billpaypage" in the URL. In other embodiments, payment account application 120 may identify the application user 102 utilizes to purchase an item as a commerce application.

In other embodiments, a payment service provider, such as payment provider server 140, monitors user financial account activity to determine if user 102 is engaged in a financial transaction, and returns the results to payment account application 120. In other embodiments, payment provider server 140 may provide notification through text messages and/or emails. The payment provider may access a user financial account and review financial transactions to determine if user 102 has engaged in a financial transaction with a merchant that normally does not provide payment services with the payment provider or otherwise accept payments from the payment provider. For example, payment account application 120 may transmit activity of user device 110, such as applications used and/or websites visited. The payment provider may review financial account activity to determine if payments made correspond to usage of the applications and/or visitation of the website. If payments do correspond to the application used and/or websites visited, the payment provider may utilize payment account application 120 to request, receive, and store payment settings corresponding to the merchant, such as payment methods and user information to enter for the merchant.

In other embodiments, a payment service provider may determine user 102 makes recurring payments, such as monthly bills or other recurring payment, to a merchant that does not provide payment services with the payment provider or is otherwise not integrated with the payment provider. Thus, the payment provider may request the user to establish an automatic debit for the recurring payment using payment account application 120. The payment provider may then utilize public APIs corresponding to the merchant to access payment webpages and complete the automatic payments.

In various embodiments, browser application 112 may be utilized by user 102 with user device 110 to establish, access, and maintain user account(s) and engage in online transactions with or without the user account(s). For example, browser application 112 may be utilized to establish one or more user accounts with a payment provider, a financial institution, or other financial provider. Browser application 112 may access the payment provider to utilize and/or maintain the user accounts. The payment providers may interact with other service providers, for example, by facilitating transactions using the user accounts, as previous discussed. User 102 may utilize browser application 112 to access merchant website and/or download commerce applications. User 102 may view item(s) on merchant websites, such as a website belonging to merchant server 130, and navigate to checkout and payment webpages when purchasing the item(s).

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include a commerce application, such as an application belonging to merchant server 130 and used to purchase item(s). In various embodiments, the commerce application may include a marketplace application corresponding to a merchant server, such as an application maintained by Ebay®, Inc. of San Jose, Calif. Other applications 114 may contain software programs, executable by a processor, including a graphical user interface (GUI) configured to provide an interface to the user.

User device 110 may further include identifiers 116 which may include, for example, identifiers such as operating system registry entries, cookies associated with payment account application 120, browser application 112, and/or other applications 114, identifiers associated with hardware of user device 110, or other appropriate identifiers, such as identifiers used for payment/user/device authentication or identification. In one embodiment, identifiers 116 may be used by a payment service provider, such as payment provider server 140, to associate user device 110 with a particular account maintained by the payment/credit provider.

In various embodiments, user device 110 includes at least one network interface component (NIC) 118 adapted to communicate with network 160 including merchant device 130 and/or payment provider server 140. In various embodiments, network interface component 118 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Merchant server 130 may be maintained, for example, by a merchant or seller offering various items, products, and/or services through a merchant location. Generally, merchant server 130 may be maintained by anyone or any entity that receives money, which includes charities as well as retailers and restaurants. In this regard, merchant server 130 may include processing applications, which may be configured to interact with user device 110 and/or payment provider server 140 over network 160 to facilitate the sale of products, goods, and/or services. However, merchant server 130 may not be integrated with payment provider server 140. For example, merchant server 130 may not accept payment through payment provider server 140, or may not contain the established infrastructure or capabilities. Thus, merchant server 130 may not provide payment services with payment provider server 140.

Merchant server 130 includes a marketplace application 132, other applications 134, a database 136, and a network interface component 138. Marketplace application 132 and other applications 134 may correspond to processes, procedures, and/or applications executable by a hardware processor, for example, a software program. In other embodiments, merchant server 130 may include additional or different software as required.

Merchant server 130 may include marketplace application 132, which may be configured to serve information over network 160 to user device 110 and/or payment provider server 140. In one embodiment, user 102 may interact with marketplace application 132 to view and purchase various items available. Thus, marketplace applications 132 may include a marketplace interface displayable on user device 110. Additionally, marketplace application 122 may determine item specific pricing data, including item sales histories, inventories, bargains, rebates, and/or other item pricing data.

Merchant server 130 may also include payment/checkout application 134, which may be configured to facilitate the purchase by user 102 of items, such as goods and/or services, identified by marketplace application 132. Payment/checkout application 134 may be configured to accept payment information from or on behalf of user 102 directly. For example, payment/checkout application 134 may include payment and checkout processes, such as API's for providing displayable webpages including a payment form and/or providing a displayable user device application GUI including a payment form. Payment/checkout application 134 may include processes to accept and authorize payment for item(s), such as acceptance and authorization of user information entered in fields of the payment form, such as user personal information, user billing/shipping address, and user financial information. In certain embodiments, payment/checkout application 134 may include processes to establish one or more user accounts to store user information and facilitate the purchase of future item(s) by user 102. Once the payment form is completed, payment/checkout application 134 may complete the purchase of item(s) by user 102.

In various embodiments, payment/checkout application 134 may be configured to accept payment information from a user but may not include integration with payment provider server 140 and thus not offer and/or accept payment service from payment provider server 140. For example, payment/checkout application 134 may lack or not allow processes to accept payment through payment provider server 140. Payment/checkout application 134 may also be configured to accept one or more different funding sources for payment. Payment/checkout application 134 may be further configured to transmit emails to a user email account with a transaction history.

Merchant server 130 includes a database 136 identifying available products, goods, and/or services (e.g., collectively referred to as items) which may be made available for viewing and purchase by user 102. Database 136 may include tracking numbers for the items, stock amounts, prices, and other item information. Additionally, database 136 may include user accounts, which may include user information, such as name, address, birthdate, payment/funding information, additional user financial information, and/or other desired user data.

In various embodiments, merchant server 130 includes at least one network interface component (NIC) 138 adapted to communicate with network 160 including user device 110 and/or payment provider server 140. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Payment provider server 140 may be maintained, for example, by an online payment service provider, which may provide payment services and/or processing for financial transactions on behalf of a user with a merchant. In this regard, payment provider server 140 includes one or more processing applications which may be configured to interact with user device 110 and/or merchant device 140 to facilitate completion of a financial transaction. Additionally, payment provider server pay provide other financial services, such as account monitoring to determine payments with online merchants and/or recurring payment. In one example, payment provider server 140 may be provided by PayPal®, Inc. of San Jose, Calif., USA. However, in other embodiments, payment provider server 140 may be maintained by or include a credit provider, financial services provider, financial data provider, and/or other service provider, which may provide payment service to user 102.

Payment provider server 140 of FIG. 1 includes a payment monitoring application 150, transaction processing application 142, other applications 144, user accounts 146, and a network interface component 148. Payment monitoring application 150, transaction processing application 142 and other applications 144 may correspond to processes, procedures, and/or applications executable by a hardware processor, for example, a software program. In other embodiments, payment provider server 140 may include additional or different software as required.

Payment monitoring application 150 may correspond to processes and/or procedures to access and monitor one or more financial accounts corresponding to user 102 and/or potential payment activity of user 102. Payment monitoring application 150 may review the financial account(s) to determine if user 102 makes a payment or is likely to make a payment to an online merchant, such as merchant server 130. Payment monitoring application 150 may receive information corresponding to visited merchant website of user 102 using user device 110, or may receive information of commerce application utilized by user 102 with user device 110. Payment monitoring application 150 may review the financial account to determine if a payment corresponds to the merchant website and/or commerce application corresponds to a payment. Payment monitoring application 150 may also monitor when a user is on a site or page that is likely to lead to a payment transaction, such as when the user is on a checkout page of a merchant app or site. If payment monitoring application 150 determines user 102 is engaged in a financial transaction or potential financial transaction using the merchant website and/or commerce application that does not provide integration (i.e. accept payment) with payment provider server 140, payment monitoring application 150 may request permission, through payment account application 120 of user device 110, to complete a financial transaction and store payment settings for future use with the merchant website and/or commerce application. As previously discussed, payment account application 120 may provide a GUI enabling user 102 to authorize completion of the financial transaction.

In other embodiments, payment monitoring application 150 may monitor one or more financial accounts to determine if user 102 makes recurring payments to the same or similar merchant, for example a monthly bill (e.g., gas, electric, car/house payment, etc.). If payment monitoring application 150 determines there is a financial transaction corresponding to a recurring payment, payment monitoring application 150 may request, through payment account application 120, permission to complete the financial transaction and establish payment debits for the recurring transaction. Payment monitoring application 150 may be further configured create and manage user accounts, such as one of user accounts 146, for user 102, such as the set-up, management, and provide various services, such as set-up and access to user financial accounts, as described herein.

Transaction processing application 142 may be configured to receive and/or transmit information from user device 110 and/or merchant server 130 for processing and completion of financial transactions. Transaction processing application 142 may include one or more applications to process financial transaction information from user 102 and/or merchant server 130. Transaction processing application 142 may further containing processes and/or procedures to complete payment forms, recall and transmit payment settings, and/or access a public API of a merchant website and/or commerce application to provide payment for the financial transaction. Transaction processing application 142 may further provide an interface for user 102 to enter and complete information corresponding to a financial transaction.

In various embodiments, payment provider server 140 includes other applications 144 as may be desired in particular embodiments to provide features to payment provider server 140. For example, other applications 144 may include security applications for implementing server-side security features, programmatic server applications for interfacing with appropriate application programming interfaces (APIs) over network 160, or other types of applications. Other applications 144 may contain software programs, executable by a processor, including a graphical user interface (GUI), configured to provide an interface to a user.

Additionally, payment provider server 140 may include user accounts 146. As previously discussed, user 102 may establish one or more user accounts with payment provider server 140. User accounts 146 may include user information, such as name, address, birthdate, payment/funding information, additional user financial information, and/or other desired user data.

In various embodiments, payment provider server 140 includes at least one network interface component (NIC) 148 adapted to communicate with network 160 including user device 110 and/or merchant server 130. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
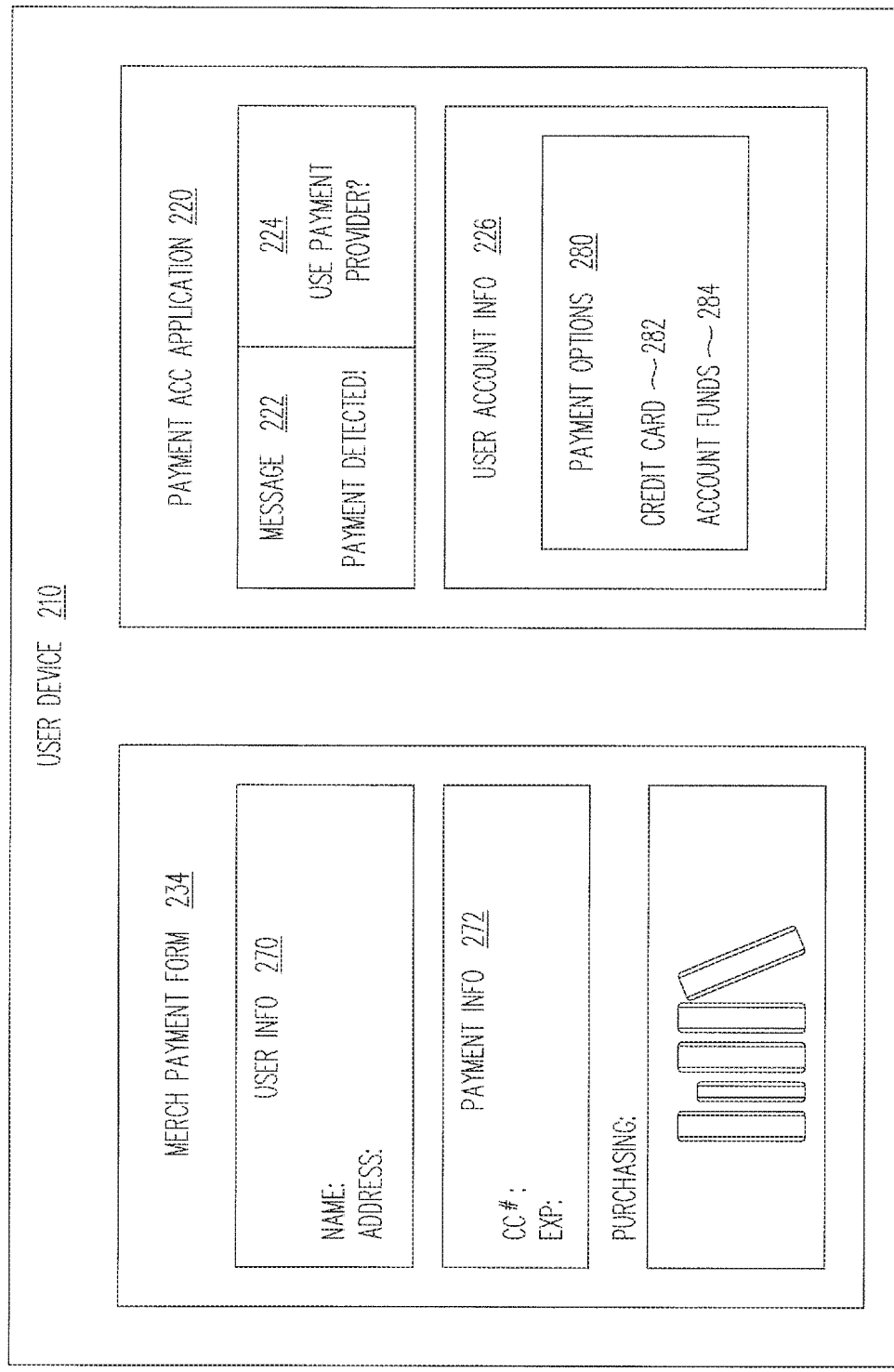
FIG. 2 is an exemplary user device interface displaying a request for use of a payment provider to complete a payment form financial transaction according to an embodiment.

FIG. 2 is an exemplary user device interface displaying a request for use of a payment provider to complete a payment form financial transaction according to an embodiment. A user device 210 shows a user device application interface corresponding generally a software interface of a merchant payment form and a payment account application, executable by one or more hardware processors. User device 210 may provide the payment account application to provide an interface to automatically complete online payment forms and recurring payments to process payments on behalf of the user even though the payment recipient may not "accept" the payment provider as a payment option. Thus, user device 210, payment account application 220, and merchant payment form 234 may correspond generally to user device 110, payment account application 120, and payment/checkout application 134, respectively, of FIG. 1.

User device 210 may correspond generally to a personal computer (PC), a smart phone, personal digital assistant (PDA), laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. User device 210 may include various software applications for execution by one or more hardware processors of user device 210. For example, user device 210 may include a payment account application 220 and a merchant payment form 234, as shown in FIG. 2. User device 210 may include further or different software applications as necessary in other embodiments.

In various embodiments, merchant payment form 234 may correspond to a browser application, such as browser application 112 of FIG. 1. Thus, merchant payment form 234 may correspond to a webpage a user navigates to during payment of an item. For example, a user may select an item for purchase on a merchant website. During completion of the purchase, the user may navigate to a webpage including a payment form to complete purchase of the item. In other embodiments, merchant payment form 234 may correspond to a software application connected to a merchant server where a user may view and select items for purchase. In such embodiments, merchant payment form 234 may correspond to processes within the software application to provide a payment form to complete purchases of items.

Merchant payment form 234 include user information 270 and payment information 272, corresponding to fields displayed within merchant form 234. User information 270 may include fields to enter user information, such as user personal information, user shipping/billing addresses, user account information. In various embodiments, a user may establish a merchant user account with the merchant, which may store user information for future purchases. Payment information 272 may include fields to enter payment information, such as user financial information or billing information including a user bank account, credit/debit card number, or payment provider account information. Payment information 272 may also be stored with the merchant where the user has previously established the merchant user account.

User device 210 also executes payment account application 220 while a user browses and selects items for purchase with a merchant. Payment account application 220 include a message 222, an accept button 224, user account information 226 with payment options 280 having credit card 282 and account funds 284. Thus, when the user arrives at merchant payment form 234 during payment and checkout of an item, payment account application 220 may detect the user has navigated to merchant payment form 234 and populates a message 222 notifying detection of a payment form that does not offer payment services from a payment provider to the user.

Message 222 of FIG. 2 includes a notification that merchant payment form 234 is detected, or "Billpage detected!" Message 222 may include accept button 224 with or near message 222 designating use of a payment provider to complete merchant payment form 234, shown as "Use payment provider?" in FIG. 2. Accept button 224 may include a process to complete merchant payment form 234 with a payment provider corresponding to payment account application 220. For example, accept button 224 may include a process to enter user and/or payment information provided by the payment provider and corresponding to the user. In certain embodiments, the payment provider may provide user financial information. However, in other embodiments, the payment provider may provide a user account established with the payment provider, or may provide temporary financial information, such as a temporary account number.

Payment account application 220 also includes user account information 226 corresponding to user information established with the payment provider. User account information may include user account login information, thus verifying a user has established a user account with the payment provider and has authority to access and use the user account to complete merchant payment form 234. Additionally, user account information 226 may display user information established with the payment provider so that the user may verify what information is used to complete merchant payment form 234.

As shown in FIG. 2, user account information 226 includes payment options 280 with two payment options, credit card 282 and account funds 284. Payment options 280 may correspond to user financial information used to complete merchant payment form 234. In FIG. 2, payment options 280 include two payment options to complete merchant payment form 234, however, other embodiments may include more, less, and/or different payment options. Credit card 282 may correspond to user credit/debit card information a user may utilize to complete merchant payment form 234. Credit card 282 may include the credit/debit card information as well as billing/shipping information necessary to complete and authorize purchase of the item. Account funds 284 may include funds corresponding to the user but held by the payment provider, such as funds transmitted from other users of the payment provider. When a user chooses to use the payment provider to complete merchant payment form 234 through accept button 224, the user may also select one of payment options 280. In various embodiments, the user may also split payment using multiple of payment options 280.

Figure 3:
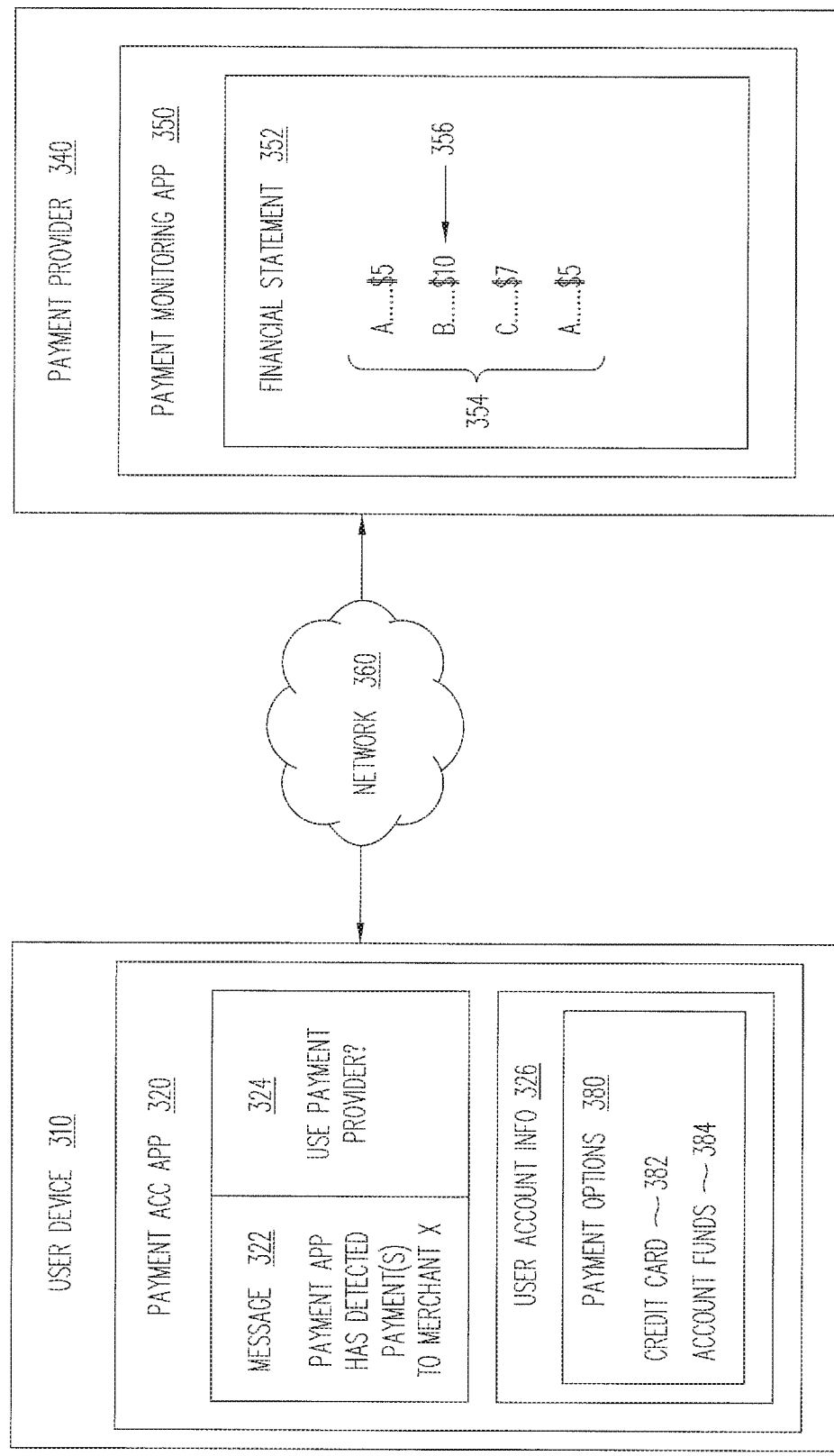
FIG. 3 is a payment provider server interaction with a payment account application on detection of a recurring payment financial transaction according to an embodiment.

FIG. 3 is a payment provider server interaction with a payment account application on detection of a recurring payment financial transaction according to an embodiment. A user device 310 and a payment provider 340 are in communication over a network 360. Payment provider 340 may review a user's financial statement 352 to determine recurring payments 354 and/or payments to merchant 356 in a payment monitoring application 350, executable by one or more hardware processors. Payment provider 340 may then request permission through payment account application 320, executable by one or more hardware processors, to utilize payment provider 340 to complete financial transactions corresponding to recurring payments 354 and/or payments to merchants 356. Thus, user device 310, payment account application 320, payment provider 340, and payment monitoring application 350 may correspond generally to user device 110, payment account application 120, payment provider server 140, and payment monitoring application 150, respectively, of FIG. 1.

Payment provider 340 may include payment monitoring application 350 which may include one or more processes or procedures to monitor financial statement 352. Financial statement 352 includes a listing of a user's financial transactions, shown as items "A, B, C, and A" in FIG. 2, with item prices "$5, 10, 7, and 5," respectively. Thus, FIG. 3 shows financial transactions corresponding to recurring payment 352, or financial transaction A, and payment to merchant 356, or financial transaction C. Payment provider 340 may analyze financial statement 352 and determine the user engages in recurring payment 354 and payment to merchant 356 using payment monitoring application 350. These payments may correspond to payments to merchants that do not offer and/or accept payment provider 340 or otherwise provide integration with payment provider 340.

Payment provider 340 may then request permission to complete recurring payment 354 and/or payment to merchant 356 through payment account application 320 over network 360. Payment application 320 includes a message 322, an accept button, and user account information 326 with payment option 380 including credit card 382 and account funds 382. Thus, when recurring payment 354 is detected, message 322 may populate a notification, shown as "Payment provider has detected payment(s) to merchant X." Additionally, payment account application 320 may include accept button 324 within or nearby message 322 with "Use payment provider?"

If a user selects accept button 324, data corresponding to the acceptance is transmitted to payment provider 340. Payment provider 340 may then establish an automatic debit from a user financial account to pay recurring payment 354 when it comes due. Payment provider 340 may then access a public API of a merchant website and/or commerce application to provide payment for the financial transaction when recurring payment 354 is due.

In other embodiments, a user may visit websites and/or use commerce applications that payment provider 340 is unaware of and thus will not immediately request permission to complete a financial transaction. However, payment monitoring application 350 may view payment to merchant 356 as coinciding with a time and/or name of the visited website or used commerce transaction. Thus, when payment account application 320 detects a user attempting to checkout using the same merchant website or commerce application, payment account application 320 may request permission to complete the transaction, and payment provider server 340 may store payment settings for future use with the merchant website and/or commerce application. Payment account application 320 may display a GUI to enter the payment settings to complete the financial transaction and for transmission to payment provider 340 for storage.

As previously discussed in reference to FIG. 2, when prior to or during selection of accept button 324, a user may select on or more of payment options 380 to complete purchase of the item. Credit card 382 and/or account funds 384 may be selectable, and the user may split payment between two or more of payment options 380. Additionally, user account information 326 may be utilized to complete information required for purchase of the item.

Figure 4:
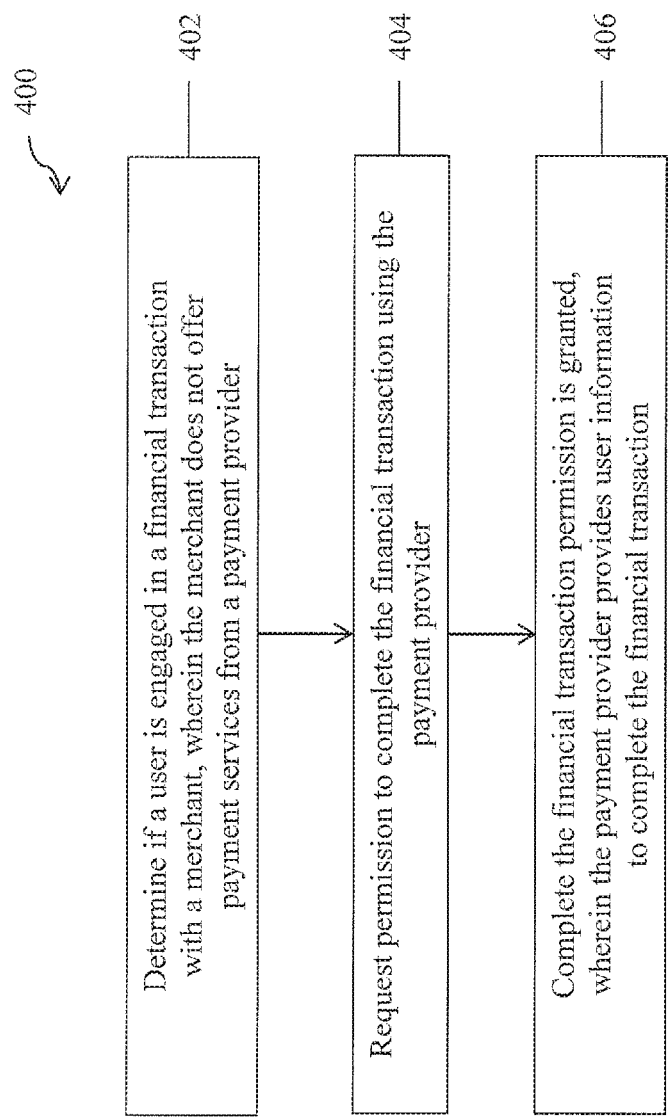
FIG. 4 is a flowchart of an exemplary process by a payment provider server for completing financial transactions according to an embodiment.

FIG. 4 is a flowchart of an exemplary process by a payment provider server for completing financial transactions according to an embodiment. Note that one or more steps, processes, and methods described herein may be omitted, performed in a different sequence, or combined as desired or appropriate.

At step 402, a user is determined to be engaged in a financial transaction with a merchant, wherein the merchant does not offer payment services from a payment provider. In one embodiment, the financial transaction is with a merchant or payment recipient that does not offer and/or accept payment services the payment provider as a payment option in the checkout page, or otherwise provide integration with the payment provider. A financial transaction may correspond to payment and checkout of an item for sale with a merchant. For example, user 102 may visit a merchant website or utilize a commerce application that displays items for sale from the merchant, for example items for sale with merchant server 130. User 102 may select one or more items for purchase and navigate to a payment and checkout webpage or GUI within the commerce application. The payment and checkout webpage/GUI may include a payment form to complete purchase of the item, where the payment form includes at least one field to enter user information including user financial information. However, the payment form may not include an option to utilize a payment provider to complete the transaction. Thus, the payment form only includes fields to enter user information.

The application may determine the user is engaged in a financial transaction through analysis of a uniform resource locator (URL) of the merchant website or the commerce application corresponding to the user. In various embodiments, the payment account application/payment provider may detect that the merchant does not accept the payment provider or is not integrated with the payment provider. Thus, the payment account application/payment provider may provide information to complete the financial transaction as discussed below.

In other embodiments, the financial transaction may correspond to a recurring payment based on processing of a user financial statement, such as a user account summary or bill statement. The payment may be to a merchant that does not accept payments through a payment provider and who has, in the past, been paid for using an alternative payment method, such as check, credit card, or other funding source.

Payment provider 140/340 executing payment monitoring application 150/350 may analyze financial statement 352 and determine recurring payment 354 are payments to the same merchant for the same amount. Thus, the payment provider may establish an automatic debit to pay for the recurring payment. The payment provider may utilize a public API of a merchant website and/or commerce application to provide payment for the recurring payment. In other embodiments, the financial transaction is a payment to a merchant previously utilized by the user. Thus, payment provider 140/340 may correlate payment to merchant 356 with a merchant website visited by the user or a commerce application utilized by the user. Payment account application 320 may request permission to utilize the payment provider when user 102 attempts to utilize the merchant again, and may store payment settings with the payment provider for future use with the merchant.

Once the user is determined to be engaged in a financial transaction, permission is requested to complete the financial transaction, at step 404. Payment account application 120/220/320 may populate message 222/322 requesting permission to complete the financial transaction. Thus, upon detection of a payment page or other financial transaction with a merchant, payment account application 120/220/320 may notify user 120 that a corresponding payment provider may be utilized to provide user information to complete the financial transaction. While in FIG. 2 and FIG. 3 message 222/322 and accept button 224/324 notify user that the payment provider may be utilized to complete the financial transaction, in other embodiments alternative communication forms may be used, such as a text message and/or email message alert. Thus, payment account application 120/220/320 may enable accept button 224/324 in payment account application 120/220/320, or may enable an acceptance button/process in a text message/email message, that initiates a process to utilize the payment provider to complete the financial transaction.

At step 406, the financial transaction is completed if permission is granted, wherein the payment provider provides user information to complete the financial transaction. The user information may correspond to information possessed by the payment provider and used to complete the financial transaction, such as user personal information, user account information, and the user financial information. Additionally, the payment provider may provide a temporary account number to complete payment of the item where funds held by the payment provider are used or additional security is required. For example, the payment provider may generate a temporary account number, such as a temporary credit card number, that may be provided to the merchant to complete the financial transaction.

A temporary account number may be utilized in place of an account number the user has previously stored with the payment provider, such as a checking account, credit/debit card, or other payment account. However, the temporary account number may also be utilized to pay the merchant for items where the user has funds stored with the payment provider. The funds may be transferred to the payment provider previously, or may have resulted from a sale of items by the user. Thus, the merchant may receive payment through the temporary account number where the payment provider is debited for the payment. The payment provider may then resolve the debit with the user account by debiting the user account funds and/or a user financial account. The temporary account number may be utilized for each individual payment instance, or may be reused for future payments to the merchant.

In other embodiments, a payment provider and/or payment account application, may detect recurring payments as discussed above. Thus, the payment account application/payment provider may complete the recurring payments for the user. In such embodiments, the payment provider may also utilize a temporary account number to complete the financial transactions, or may use user financial information stored with the payment provider. As previously discussed, the recurring payments may be completed solely by the payment provider, for example by accessing public API's of the merchant and completing payments. The payment provider may also provide a convenient interface to the user in order to manage the recurring payment/automatic debit, for example using payment account application 120/220/320.

Figure 5:
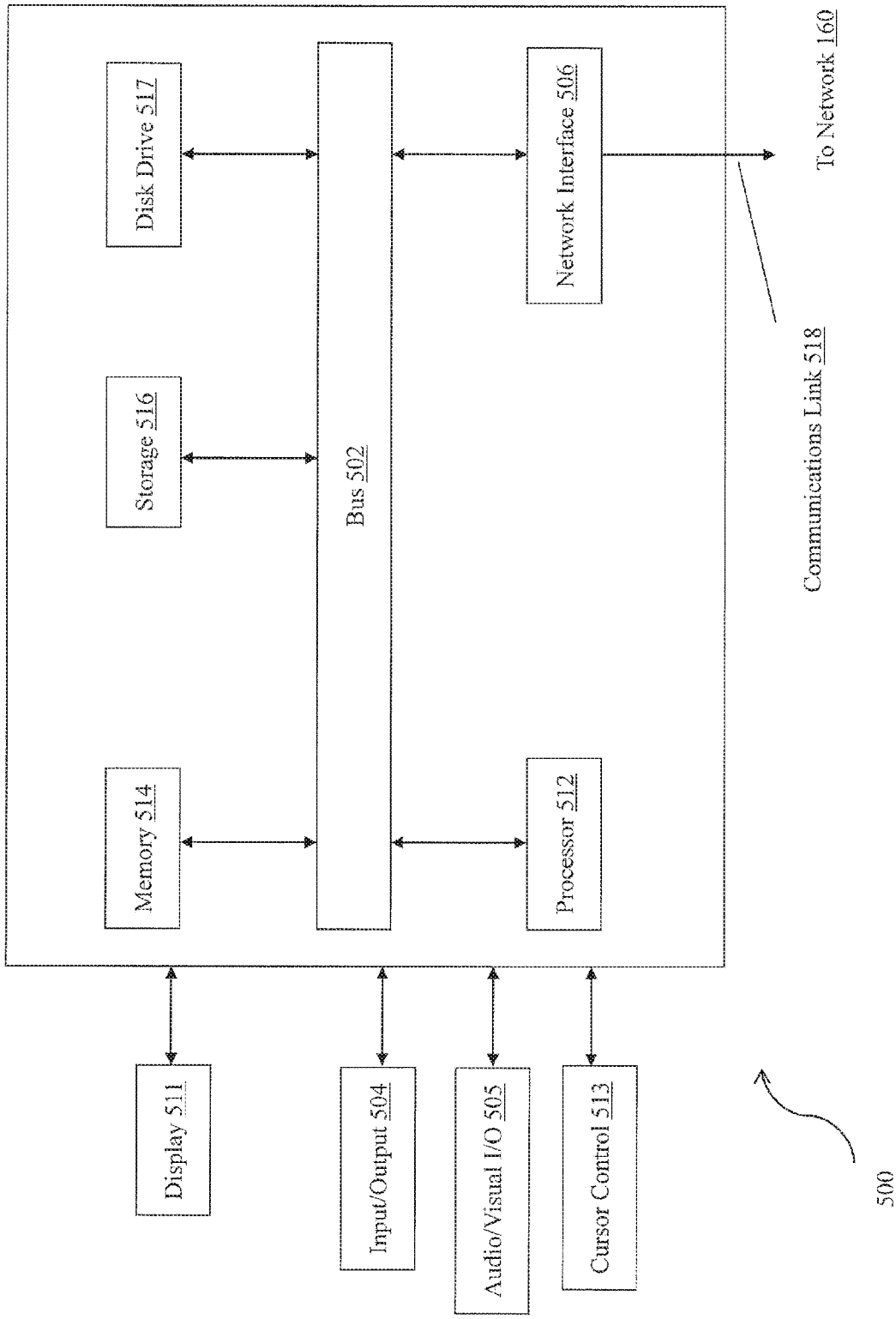
FIG. 5 is a block diagram of a computer system suitable for implementing one or more components in FIG. 1 according to an embodiment.

FIG. 5 is a block diagram of a computer system 500 suitable for implementing one or more embodiments of the present disclosure. In various embodiments, the user device may comprise a personal computing device (e.g., smart phone, a computing tablet, a personal computer, laptop, PDA, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, a merchant server, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving, by an online service provider, navigation data comprising an Internet address from a service provider application executing on a computing device;
determining from the navigation data that the computing device is at a checkout interface of a website of a merchant associated with the Internet address;
determining an electronic statement associated with the computing device;
determining that an electronic transaction to be processed with the merchant at the website corresponds to a recurring transaction to the merchant based on the electronic statement;
in response to a permission received from the computing device, establishing an automatic transaction to the merchant for the recurring transaction based on the electronic statement and the website; and
when the recurring transaction is due:
automatically accessing a public application programming interface (API) of the website; and
providing, by the online service provider, the automatic transaction for the recurring transaction without the computing device utilizing the service provider application or the website.

2. The system of claim 1, wherein the electronic transaction on the website comprises an electronic payment form on the website that comprises at least one interface field for entry of data.

3. The system of claim 2, wherein the service provider application checks one of a uniform resource locator (URL) or a commerce application corresponding to the electronic payment form to determine that the computing device is engaged in the electronic transaction.

4. The system of claim 1, wherein the operations further comprise:
providing a temporary account number to complete the automatic transaction, wherein the temporary account number comprises one of a temporary credit card number or a temporary funding source account identifier.

5. The system of claim 1, wherein the determining that the electronic transaction corresponds to the recurring transaction comprises:
monitoring a user account utilized by the service provider application to determine if the computing device is engaged in the electronic transaction.

6. The system of claim 1, wherein the operations further comprise:
providing an interface within the service provider application to manage the automatic transaction.

7. The system of claim 1, wherein the electronic transaction was previously performed using the service provider application, and wherein the operations further comprise:
determining settings used by the service provider application for the electronic transaction; and
storing the settings for the recurring transaction.

8. A method comprising:
receiving, by a service provider, navigation data comprising an internet address from a service provider application executing on a computing device;
determining from the navigation data that the computing device is at a checkout interface of a website of a merchant associated with the Internet address;
accessing an electronic statement associated with the computing device;

determining that an electronic transaction to be processed with the merchant at the website corresponds to a recurring transaction with the merchant based on the electronic statement;

in response to receiving a permission from the computing device, establishing an automatic transaction with the merchant for the recurring transaction based on the electronic statement and the website; and when the recurring transaction is due:
- automatically accessing a public application programming interface (API) of the website; and
- providing, by the service provider, the automatic transaction for the recurring transaction without the computing device utilizing the service provider application or the website.

9. The method of claim 8, wherein the electronic transaction on the website comprises an electronic form on the website that comprises at least one interface field for entry of data.

10. The method of claim 9, wherein the service provider application checks one of a uniform resource locator (URL) or a commerce application corresponding to the electronic form to determine that the computing device is engaged in the electronic transaction.

11. The method of claim 8, further comprising:
providing a temporary account number to complete the automatic transaction, wherein the temporary account number comprises one of a temporary credit card number or a temporary account identifier.

12. The method of claim 8, wherein the determining that the electronic transaction corresponds to the recurring transaction comprises:
monitoring a user account utilized by the service provider application to determine if the computing device is engaged in the electronic transaction.

13. The method of claim 8, further comprising:
providing an interface within the service provider application to manage the automatic transaction.

14. The method of claim 8, wherein the electronic transaction was previously performed using the service provider application, and wherein the method further comprises:
determining settings used by the service provider application for the electronic transaction; and
storing the settings for the recurring transaction.

15. A non-transitory machine readable medium having stored thereon machine-readable instructions executable to cause a machine to perform operations comprising:
receiving, by a payment provider, navigation data comprising an internet address from a payment provider application executing on a device of a user having an account with the payment provider;
determining from the navigation data that the device is at a checkout interface of a website of a merchant associated with the internet address;
accessing a financial statement associated with the account with the payment provider,
determining that a financial transaction to be processed with the merchant at the website corresponds to a recurring payment to the merchant based on the financial statement;
in response to a permission from the user, establishing an automatic payment to the merchant for the recurring payment using the financial statement and the website; and
when the recurring payment is due:
- automatically accessing a public application programming interface (API) of the website; and
- providing, by the payment provider, the automatic payment for the recurring payment without the device utilizing the payment provider application or the website.

16. The non-transitory machine readable medium of claim 15, wherein the financial transaction on the website comprises an electronic payment form on the website that comprises at least one interface field for entry of data.

17. The non-transitory machine readable medium of claim 16, wherein the payment provider application checks one of a uniform resource locator (URL) or a commerce application corresponding to the electronic payment form to determine that the device is engaged in the financial transaction.

18. The non-transitory machine readable medium of claim 15, wherein the operations further comprise:
providing a temporary account number to complete the automatic payment, wherein the temporary account number comprises one of a temporary credit card number or a temporary payment account identifier.

19. The non-transitory machine readable medium of claim 15, wherein the determining that the financial transaction corresponds to the recurring payment comprises:
monitoring a user financial account utilized by the payment provider application to determine if the device is engaged in the financial transaction.

20. The non-transitory machine readable medium of claim 15, wherein the financial transaction is previously performed using the payment provider application, and wherein the operations further comprise:
determining payment settings used by the payment provider application for the financial transaction; and
storing the payment settings for the recurring payment.

* * * * *

UNITED STATES PATENT AND TRADEMARK OFFICE
CERTIFICATE OF CORRECTION

PATENT NO. : 10,223,677 B2
APPLICATION NO. : 15/700637
DATED : March 5, 2019
INVENTOR(S) : Kamal Zamer Page 1 of 1

It is certified that error appears in the above-identified patent and that said Letters Patent is hereby corrected as shown below:

In the Claims

In Column 18, Line 5, change "payment provider," to --payment provider;--.

Signed and Sealed this
Second Day of July, 2019

Andrei Iancu
*Director of the United States Patent and Trademark Office*